United States Patent [19]

Kumazawa et al.

[11] Patent Number: 5,295,086
[45] Date of Patent: Mar. 15, 1994

[54] METHOD OF PRODUCING NOISE FREE FREQUENCY SPECTRUM SIGNALS

[75] Inventors: Mineo Kumazawa; Yuichi Imanishi; Toshio Matsuura, all of Tokyo, Japan

[73] Assignee: Jeol Ltd., Tokyo, Japan

[21] Appl. No.: 493,160

[22] Filed: Mar. 14, 1990

[30] Foreign Application Priority Data

Dec. 7, 1989 [JP] Japan ................................ 1-317969

[51] Int. Cl.$^5$ ............................................ G06F 15/20
[52] U.S. Cl. ...................................... 364/572; 364/485
[58] Field of Search ............... 364/572, 574, 578, 485; 381/46, 47

[56] References Cited

U.S. PATENT DOCUMENTS 4,314,347 2/1982 Stokely ................................ 364/574
4,916,646 4/1990 Papoff et al. ........................ 364/574

OTHER PUBLICATIONS

"A New Method of Spectral Analysis and Its Application to the Earth's Free Oscillations: The 'Sompi Method'", Sadaki Hori, Yoshio Fukao, Mineo Kumazawa, Muneyoshi Furumoto and Akihiko Yamamoto, *Journal of Geophysical Research*, vol. 94, No. B6, pp. 7535–7553, Jun. 10, 1989.

Primary Examiner—Jack B. Harvey
Assistant Examiner—Ellis B. Ramirez
Attorney, Agent, or Firm—Webb, Burden, Ziesenheim & Webb

[57] ABSTRACT

Method of making a spectral analysis of a free induction decay signal picked up by a pulse nuclear magnetic resonance spectrometer. The sine component and the cosine component of the signal which are $\pi/2$ out-of-phase are sampled. The resulting data is analyzed by the Sompi method extended to the complex domain. The Sompi method utilizes an autoregressive model.

10 Claims, 5 Drawing Sheets

Min. = AIC(19,3)

METHOD OF PRODUCING NOISE FREE FREQUENCY SPECTRUM SIGNALS

FIELD OF THE INVENTION

The present invention relates to a computer implemented method for converting and enhancing the digital data corresponding to the time series signal of an analytical instrument using an autoregressive model to provide a substantially noise free frequency spectrum signal.

BACKGROUND OF THE INVENTION

Oscillation signals such as seismic waves have been analyzed, using an autoregressive model. For this analysis, dumped oscillation signals are sampled at a uniform-time interval.

The Sompi method utilizing autoregressive models has been recently proposed to offer higher accuracy than the maximum entropy method (MEM) and the linear prediction method, which are also based on autoregressive methods (*J. Geophys. Res.* 94, 7535 (1989)). The Sompi method algebrically derives the parameters of wave elements from the time series data, sampled at a uniform-time interval. Time series data is described in a linear combination of dumped oscillation signals as equation (1), where the subscript denotes the wave element.

$$x_{tl} = \Sigma A_l \exp(-2\pi g_l \Delta t \cdot t) \cos(2\pi F_l \Delta t \cdot t + \phi_l) \quad (1)$$

The parameters include frequency (f), attenuation coefficient (g), initial phase ($\phi$), and initial amplitude (A). In the above equation, t is a variable expressing time taken discretely, and $\Delta t$ is the sampling interval.

If the parameters of various waves are found, it is easy to represent them in the form of a spectrum on the frequency (f) axis by substituting the parameters into a Lorentzian distribution function.

In the Sompi method data $\{x_t\}$ taken at a uniform-time and given by equation (1) is separated into signal component $\{u_t\}$ and noise component $\{n_t\}$. That is, $$x_t = u_t + n_t \quad (2)$$

It is now assumed that the noise component has a Gaussian distribution.

If the nature of the signal component can be completely determined, i.e., it can be described in terms of f, g, $\phi$, and A, then the signal component can be completely described, using an autoregressive model, as given by equation (3).

$$\sum_{j=-m}^{m} a_j u_{t-j} = 0 \quad (3)$$

where $a_j$ is an autoregressive coefficient, and m is the predetermined maximum autoregressive order.

The autoregressive equation used in the linear prediction method contains noise component as given by equation (4), and spectral components are biased.

$$\sum_{j=-m}^{m} a_j x_{t-j} = n_t \quad (4)$$

When the data $\{x_t\}$ is expressed using an autoregressive model as given by equation (3), if the fitting error is given by a statistical amount S, then this amount is given as follows.

$$
\begin{aligned}
S &= \lim_{N \to \infty} (1/(2(N-m)+1)) \sum_{t=-N+m}^{N-m} \left( \sum_{j=-m}^{m} a_j x_{t-j} \right)^2 \\
&= \lim_{N \to \infty} (1/(2(N-m)+ \\
&\quad 1)) \sum_{t=-N+}^{} \left( \sum_{j=-m}^{m} a_j u_{t-j} + \sum_{j=-m}^{m} a_j n_{t-j} \right)^2 \\
&= \sum_{j=-m}^{m} \sum_{j'=-m}^{m} a_j a_{j'} \lim_{N \to \infty} (1/(2(N-m)+ \\
&\quad 1)) \sum_{t=-N+m}^{N-m} n_{t-j} n_{t-j'} \\
&= \sum_{j=-m}^{m} \sum_{j'=-m}^{m} a_j a_{j'} \sigma^2 \delta_{ij} \\
&= a^2 \sigma^2
\end{aligned}
\quad (5)
$$

where $$\sum_{j=-m}^{m} a_j^2 = a^2,$$

and $\sigma^2$ s the variance.

An autoregressive model at the order m can be determined by finding the autoregressive coefficients which minimize the fitting error, given by equation (5).

We now give condition (6)

$$\sum_{j=-m}^{m} a_j^2 = a^2 = 1 \quad (6)$$

Using Lagrange's Method of undetermined multiplier, we have $$P \cdot A = \lambda A \quad (17)$$

where $$P = (P_{jk})$$
$$(j = -m, m; k = -m, m)$$

$$A = \begin{pmatrix} a_{-m} \\ \cdot \\ \cdot \\ a_o \\ \cdot \\ \cdot \\ a_m \end{pmatrix}$$

$$P_{jk} = P_{kj} = \frac{1}{2(n-m)+1} \sum_{i=-N+m}^{N-m} x_{i-j} x_{i-k} \quad (-m \leq k \leq m)$$

The minimum eigenvalue $\lambda_1$ of equation (7) provides the minimum fitting error (power of noise). An eigenvector corresponding to this eigenvalue gives an autoregressive coefficient. In this way, autoregressive coefficients are derived. In the Sompi method, solutions, i.e., the frequencies f and the attenuation constants g, are derived from these autoregressive coefficients in the manner described below.

Taking the z transform of equation (3) results in $$A(z) \cdot U(z) = 0 \quad (8)$$

where $$A(z) = \sum_{k=-m}^{m} a_k z^{-k} \quad (9)$$

$$U(z) = \sum_{k=0}^{\infty} u_j z^j \quad (10)$$

$$Z = e^{-i\omega \Delta t} \quad (11)$$

$$\omega = 2\pi (f - ig), \; i^2 = -1 \quad (12)$$

In equation (11), $\Delta t$ is the aforementioned sampling interval. In equation (8), since a signal is given by $U(z)$, if any signal component exists, then $U(z) \neq 0$. Under this condition, in order that equation (8) hold at all times, the relation, $A(z) \neq 0$, must hold.

After substituting the autoregressive coefficients calculated from equation (7) into equation (9), the algebraic equation, $A(z) = 0$, is solved for z. The solutions are modified using equations (11) and (12) to find spectral parameters f and g. The values of f and g are substituted into equation (1). The other characteristic parameters A and $\phi$ of the wave elements can be found by applying the least squares method to data $\bar{x}_i$ sampled at uniform-time interval. Using these results and equation (1), the power of the spectrum is given by $$PW_l = (1/N) \cdot \Sigma x_{il}^2$$

where N is the data length.

In a system described by an autoregressive model, if the autoregressive order is set less than the number of spectral peaks contained in a spectrum in practice, then the resolution of the obtained spectrum deteriorates. Conversely, if the order is made too large, the resolution is improved but spurious spectra are contained in the results.

In many cases, autoregressive orders suitable for unknown data have been heretofore determined empirically. This is laborious to perform. In order to avoid this laborious procedure, theoretical determination of appropriate autoregressive orders has been attempted. H. Akaike has proposed so-called Akaike's information criterion, AIC (m), to determine optimum autoregressive orders. According to Akaike's theory, the value of m ch minimizes the AIC is the optimum order.

$$AIC(m) = N \log \sigma^2(m) + 2B \quad (1)$$

where m is the autoregressive order, N is the data length, B is the number of parameters, and $\sigma^2(m)$ is the variance obtained when the autoregressive order is m.

Time series data taken from a free induction decay signal obtained from a pulse NMR spectrometer contains two components, cosine component and sine component, which are $\pi/2$ out-of-phase. It is the common practice to process such signals by complex Fourier transform. However, data analysis by Fourier transform cannot separate noise component from intrinsic signal component. One conceivable method of solving this problem is to analyze data obtained from a pulse NMR spectrometer by the Sompi method. In the convention Sompi method, only real parts, or the cosine components, are analyzed. Therefore, the conventional Sompi method is not adequate to analysis of data obtained by a pulse NMR spectrometer.

In analysis of observed time series data, typically the data obtained by pulse NMR spectroscopy, often contain large amounts of noise. In such a case, if above-described Akaike's information criterion, AIC (m), is used to estimate the optimum autoregressive order m at which the norm AIC (m) assumes its minimum value, then AIC may assume no locally minimum value provided that a large amount of noise is contained. This makes it difficult to select the optimum autoregressive order from plural autoregressive orders, by the Sompi method or other method.

The conventional method of displaying the results of an analysis using an autoregressive model is only to provide a graphical display of the solutions on the f-g plane. Therefore, it is not easy to compare this graphical display with a spectrum which is drawn on the f-axis as frequently done in the prior art techniques.

SUMMARY OF THE INVENTION

It is an object of the present invention to provide a method for converting and enhancing the digital data corresponding to the time series data of an analytical instrument sampled at a uniform-time interval and having two components (cosine and sine components) of a signal which are $\pi/2$ out-of-phase, such as a free induction decay signal obtained from a pulse NMR spectrometer, at quite high resolution utilizing an extension of the Sompi method that is one method of analyzing signal waves by the use of an autoregressive model to provide a substantially noise free frequency spectrum signal.

To achieve this object, the two components which are $\pi/2$ out-of-phase are sampled, and the Sompi method for analyzing time series data using an autoregressive model is extended to the complex domain and applied to these two components to convert and enhance to a frequency spectrum signal.

It is an object of the invention to provide a method to convert and enhance a time series signal of an analytical instrument, such as an NMR spectrometer, FDI signal, or an FTMS output signal, containing a large amount of noise by analyzing the time series data by the use of an autoregressive model to obtain solutions and then selecting appropriate ones from the solutions to provide a substantially noise free frequency spectrum.

To achieve this object, the frequencies and the attenuation constants are found from the time series data, by the use of the autoregressive model. Using the derived frequencies and attenuation constants, the least squares method is applied to the time series data to find the initial amplitudes and the phases which are other parameters of the wave elements. In order to select the optimum ones from these found solutions, Akaike's information criterion, AIC, is calculated, using information about the solutions. Let m be the other of the autoregressive model. This method comprises the following steps:

(a) With respect to the solutions of each order m, the powers or initial amplitudes of wave elements in the same order are compared. The relations for autoregressive order m are sorted in the descending order of powers or initial amplitudes.

(b) N solutions are selected successively from the ordered solutions in order m. The least squares method is applied to the time series data, to find the initial amplitudes and the phases of the n waves by the use of the frequencies and the attenuation constants of the n waves of the signal.

(c) Akaike's information criterions, AIC (m,n)s, are calculated from the parameter n by successively substituting the ordered values of the waves at autoregressive order m.

(d) Steps, (a)–(c), are repeated for each autoregressive order m, which is successively increasing.

(e) A combination of an order $m_o$ and the number of solutions n which minimizes the AIC (m, n) is found.

(f) Then, $n_o$ solutions of upper orders are extracted from the solutions at the order $m_o$. The extracted solutions are transmitted, displayed or recorded as a substantially noise free frequency spectrum.

It is a further object of the invention to provide a method of displaying a conventional spectrum on the f-axis and a spectrum on the f-g plane together.

This object is achieved by plotting the spectral components contained in the solutions on the frequency (f) axis to display them and drawing the spectral components along the frequency (f) axis and the attenuation constant (g) axis so that this spectrum on the f-g plane is juxtaposed with the spectrum drawn on the f-axis.

In accordance with the present invention, in order to apply the Sompi method to two components of a signal taken at intervals of time, cosine and sine components, which are $\pi/2$ out-of-phase such as free induction decay signals obtained from a pulse NMR spectrometer, equations (2) and (3) are extended to the complex domain. Thus, $$R_t = w_t + n_t \qquad (13)$$

where $R_t = x_t + iy_t$ (data taken at intervals of time)
$w_t = u_t + iv_t$ (signal component)

$$\sum_{j=-m}^{m} c_j R_{t-j} = 0$$

where $$c_j = a_j + i b_j \qquad (14)$$

The computation is performed in such a way that the cosine and sine components of the free induction decay signal obtained from the pulse NMR spectrometer containing the real part and the imaginary part, respectively. This improves the accuracy. Also, the effective data region can be expanded to correspond to both cosine and sine components.

Because of these modifications, the matrix elements of equation (6) handling an eigenvalue problem include additional elements as given by $$Q \cdot C = \lambda' C \qquad (15)$$

where $$Q = \begin{pmatrix} P_{jk}^{xx} + P_{jk}^{yy} & -P_{jk}^{yx} + P_{jk}^{xy} \\ -P_{jk}^{xy} + P_{jk}^{yx} & P_{jk}^{xx} + P_{jk}^{yy} \end{pmatrix}$$

$$P_{jk}^{xx} = P_{kj}^{xx} = L \sum_{t=-N+m}^{N+m} x_{t-k} x_{t-j}$$

$$P_{jk}^{yy} = P_{kj}^{yy} = L \sum_{t=-N+m}^{N+m} y_{t-k} y_{t-j}$$

-continued $$P_{jk}^{yx} = P_{kj}^{yx} = L \sum_{t=-N+m}^{N+m} y_{t-k} x_{t-j}$$

$$P_{jk}^{xy} = P_{kj}^{xy} = L \sum_{t=-N+m}^{N+m} x_{t-k} y_{t-j}$$

$$L = 1/(2(N-m)+1)$$

$$C = \begin{pmatrix} a_{-m} \\ \vdots \\ a_o \\ \vdots \\ a_m \\ \vdots \\ b_{-m} \\ \vdots \\ b_o \\ \vdots \\ b_m \end{pmatrix}$$

In this way, both cosine and sine components are used in the calculation of A and $\phi$ after f and g are determined. Consequently, A and $\phi$ can be computed with greater accuracy, and the resolution can be increased.

In another feature of the invention, Akaike's information criterion, AIC, is extended as a function n, the number of wave elements, in addition to the autoregressive order m. N, is the number of wave element's candidates to be calculated in the AIC at autoregressive order m. The AIC is extended as follows:

$$AIC(m, n) = N \log \sigma^2(m,n) + 2B \qquad (2)$$

The number n of frequency components corresponds to the number of line spectra. In the above equation, $\sigma^2$ (m,n) is the variance calculated from n waves when the autoregressive order is m. The solutions calculated from the autoregressive order m are m in number. An autoregressive order best suited to unknown data and n spectra to be taken into account at this time can be determined from the norm AIC (m, n) without relying on experience.

DETAILED DESCRIPTION OF THE INVENTION

Figure 2:
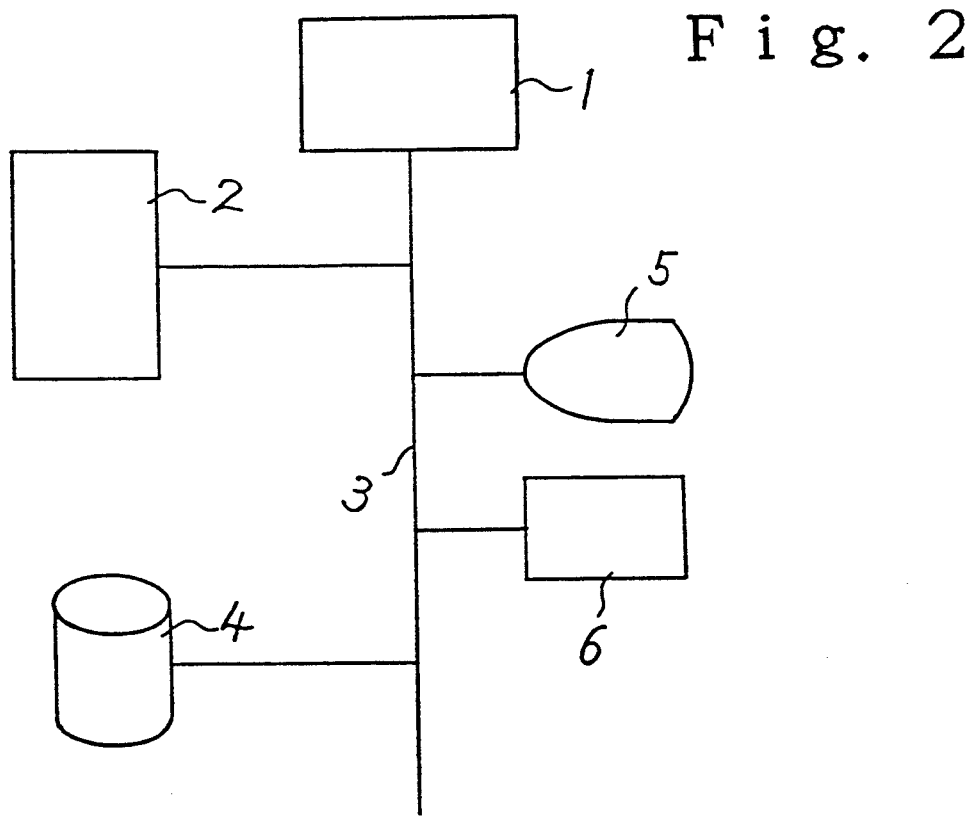
FIG. 2 is a schematic block diagram of an apparatus for carrying out a method according to the invention.

Referring to FIG. 2, there is shown a system which carries out a method according to the invention. This system comprises a CPU 1, a pulse NMR spectrometer 2, a bus line 3, a magnetic disk 4, a display unit 5, and a plotter 6. The magnetic disk 4, the display unit 5, and the plotter 6 are connected with the NMR spectrometer 2 and also with a CPU 1 via the bus line 3.

Figure 1:
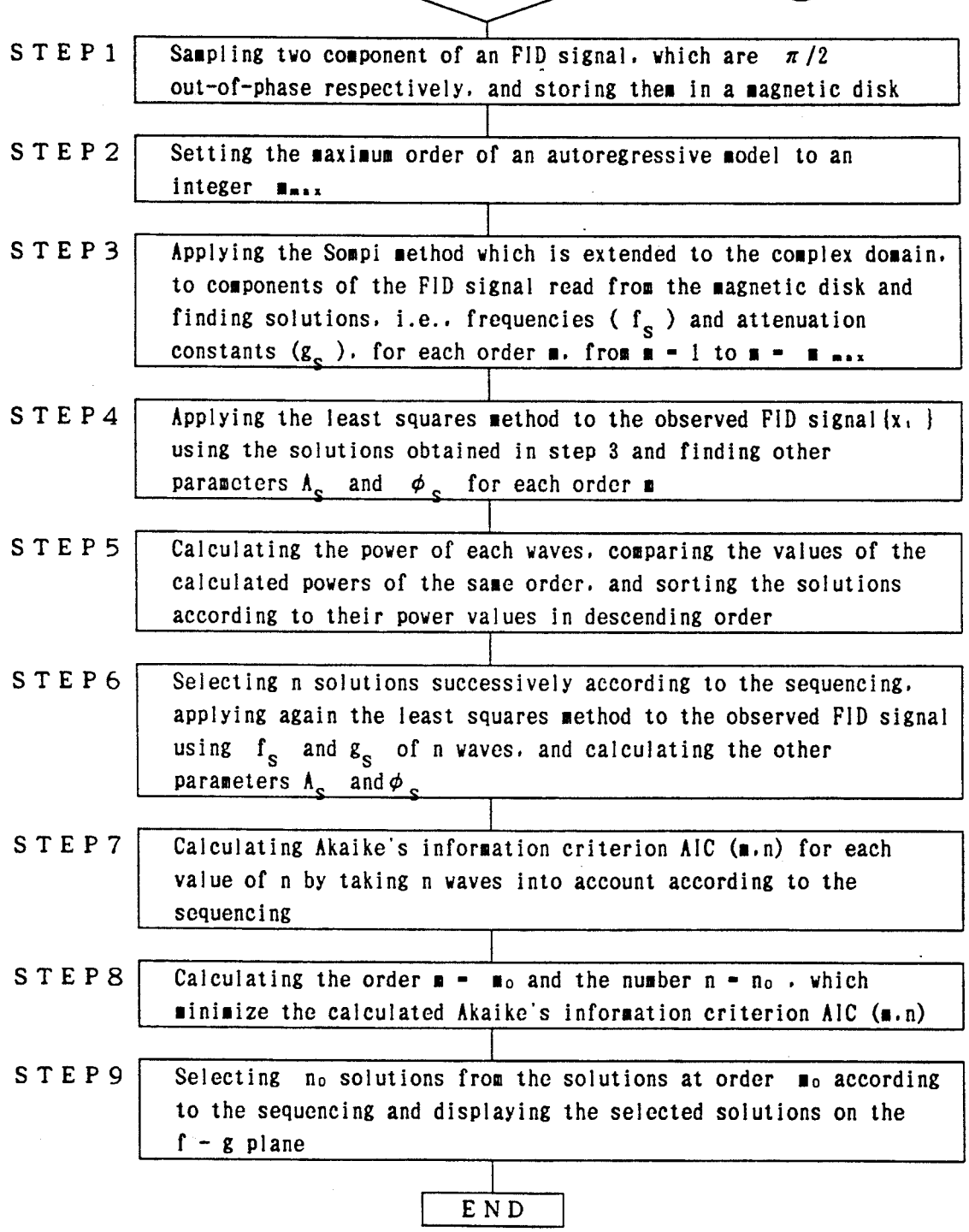
FIG. 1 is a flowchart illustrating a method according to the invention.
Figure 3:
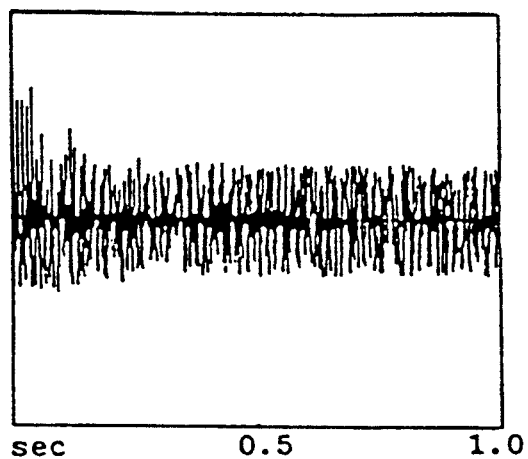
FIG. 3 is a diagram showing the cosine component of a free induction decay signal obtained from a pulse NMR spectrometer.

Referring also to the flowchart of FIG. 1, a sample is irradiated with a short burst or pulse of RF energy in the pulse NMR spectrometer 2. The excited nuclei produce a free induction decay (FID) signal having cosine and sine components which are $\pi/2$ out-of-phase. Only the cosine component is shown in FIG. 3. These two components are stored in the magnetic disk 4 (step 1). Then, the maximum order of an autoregressive model is set to an integer $m_{max}$ (step 2). Considering the number of spectral peaks obtained by an ordinary measurement, the integer $m_{max}$ is 30, for example.

Subsequently, the cosine and the sine components of the FID signal are read from the magnetic disk 4. The Sompi method which is extended to the complex domain is applied to these two components to find solutions, i.e., frequency f and attenuation constant g, for each order m, from m=1 to m=$m_{max}$. As a result, solutions given by $$\{j=1, 2, 3, \ldots, i | f_{ij} g_{ij}\}$$

are found for each order m=i (i=1, 2, 3, ..., $m_{max}$) The least squares method is applied to the observed FID signal $x_t$ using the solutions, from i=1 to i=$m_{max}$, to find other parameters A and $\phi$ of the waves. In this way, waves determined by parameters $\{j=1, 2, 3, \ldots, i | f_{ij}, g_{ij}, \phi_{ij}, A_{ij}\}$ are derived for each order m=i (i=1, 2, 3, ..., $m_{max}$) (step 4).

The power of each wave is calculated. The values of the calculated powers of the same order are compared. The solutions are arranged in descending order of power for each order (step 5). Since the calculated values of the powers correspond to the magnitudes of spectra, the error would be reduced with increasing power.

N solutions are successively selected according to the sequencing for every order m. The least squares method is again applied to f and g of n waves of an observed FID signal $x_t$ to calculate the other parameters A and $\phi$ (step 6).

Akaike's information criterion, AIC (m, n) is calculated for each value of n by taking n waves into account according to the sequencing for each order m (step 7).

Then, order m=$m_o$ and number n=$n_o$ which minimize the calculated Akaike's information criterion, AIC (m, n) are calculated under the conditions $$1 \leq n \leq m \leq m_{max}$$

Figure 6:
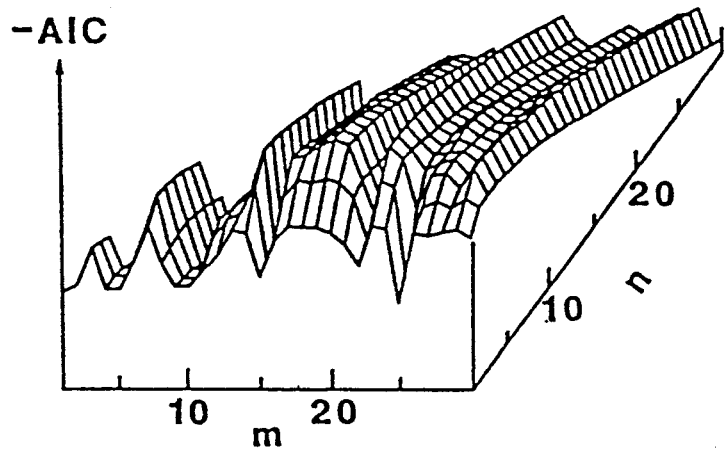
FIG. 6 is a diagram showing a graphical display of −AIC (m, n) calculated from the solutions.
Figure 7:
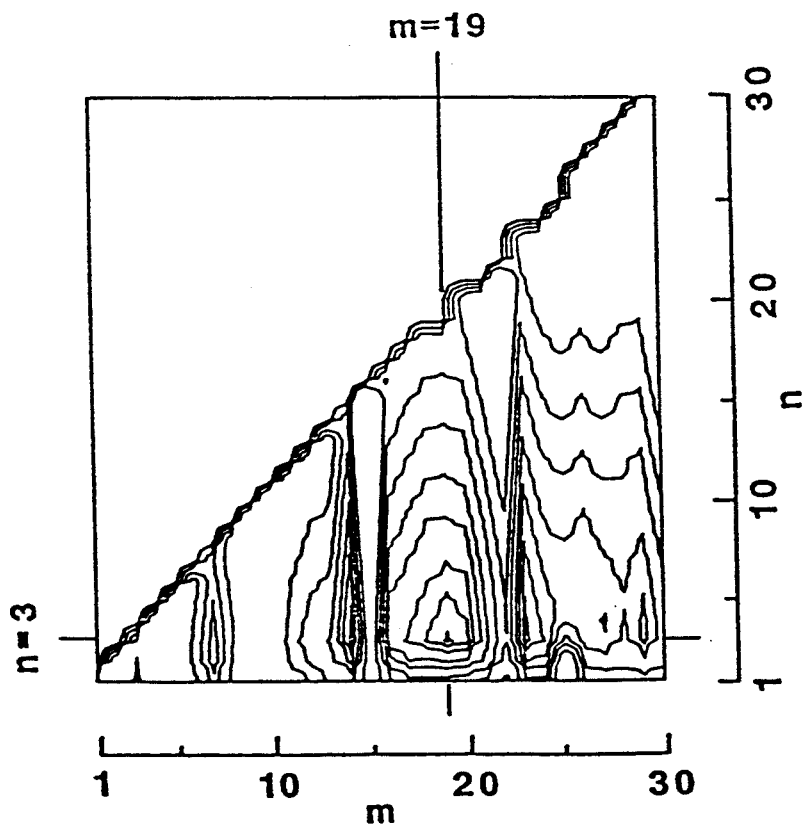
FIG. 7 is a contour map of −AIC (m, n) displayed in FIG. 6.

The results of $-$AIC (m, n) calculated by the CPU 1 are displayed on the m-axis and also on the n-axis in three dimensions as shown in FIG. 6. A contour map of $-$AIC (m, n) drawn on the m- and n-axes is shown in FIG. 7. In this case, the norm AIC (m, n) assumes its minimum values at some points (m, n). The CPU 1 finds (19, 3) as a minimum point ($m_o$, $n_o$) at which AIC (m, n) takes its minimum value (step 8).

Figure 4:
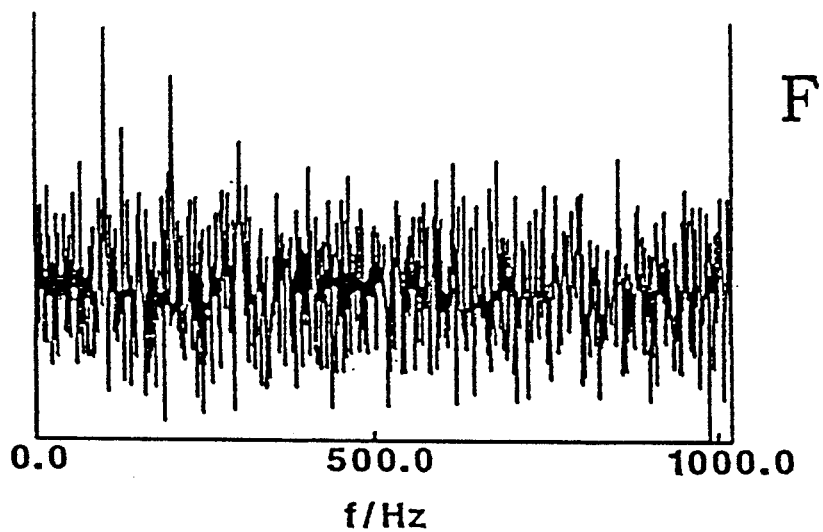
FIG. 4 is a diagram showing a spectrum obtained by the Fourier transform.
Figure 5:
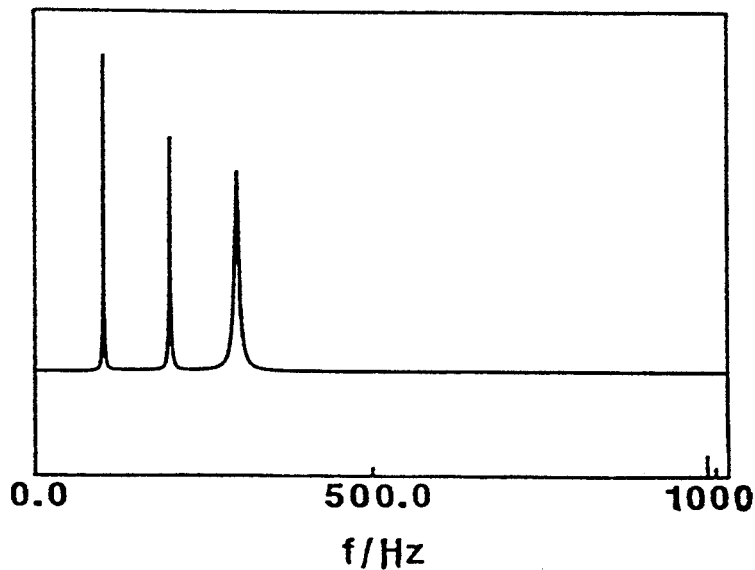
FIG. 5 is a diagram showing a spectrum obtained in accordance with the invention.
Figure 8:
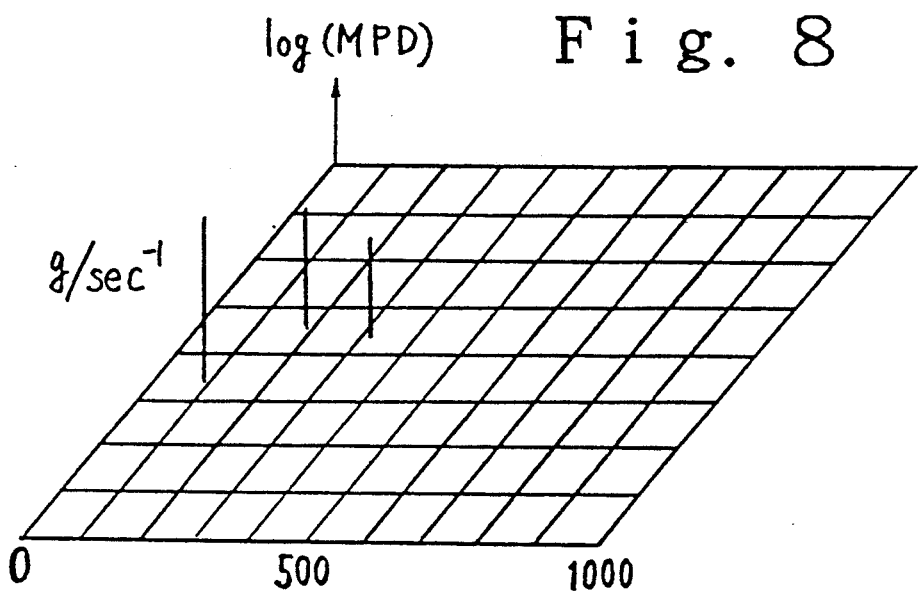
FIG. 8 is a diagram showing a graphical display of selected solution on the f-g plane.

Several solutions are obtained at order $m_o$=19. Of these solutions, three solutions ($n_o$=3) of higher orders are selected according to the aforementioned sequencing as the most probable spectra. The selected solutions are drawn on the f-g plane to display the spectra (step 9). That is, the solutions used for the calculation of AIC (19, 3) are selected and displayed. An example of this display is shown in FIG. 8. Each solution is substituted into equation (16) which is a Lorentzian distribution function to obtain a spectrum on the f-axis.

$$X(f) = K/\{1 + (f_o - f)^2/g_o^2\} \quad (16)$$

where $f_o$ and $g_o$ indicate the values of solutions of the found f and g; K is the power or the square of the power. Comparison of the spectrum of FIG. 5 with the spectrum of FIG. 4 obtained by the Fourier transform techniques reveals that the noise component is completely removed from the FID signal picked up by the pulse NMR spectrometer and that the FID signal is displayed at quite high resolution.

Figure 9:
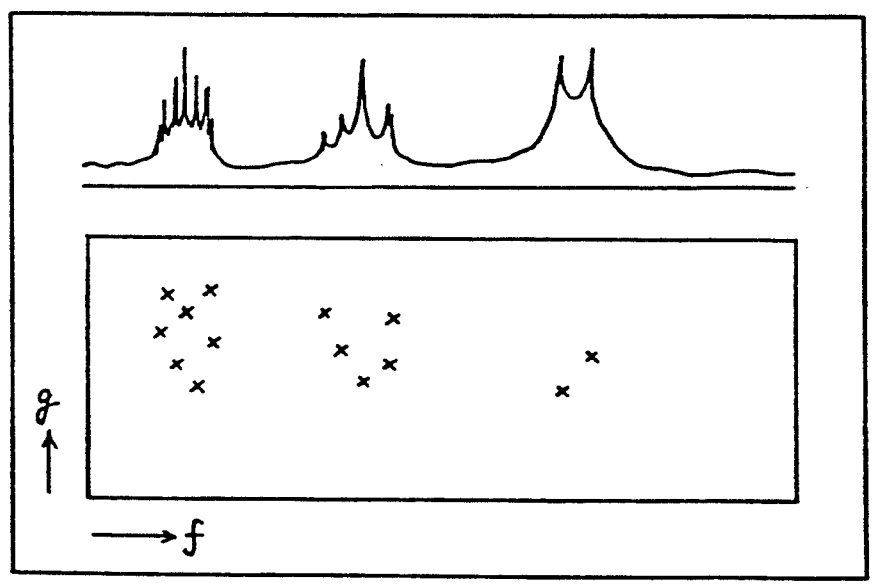
FIG. 9 is a diagram in which a spectrum drawn on the f-g plane is juxtaposed with a spectrum drawn on the frequency (f) axis.

In order to compare the spectrum created by this FID signal with a spectrum or other waveform obtained by the Fourier transform analysis, it is sometimes necessary to observe a spectrum drawn on the f-axis. At this time, it may be difficult to recognize spectral peaks, because they are superimposed. In this case, as shown in FIG. 9, simultaneously with the display of the spectrum on the f-axis, the solutions are displayed on the f-g plane on the viewing screen of the display unit 5, such as a CRT, or printed out by the plotter 6. If any peaks are superimposed in a spectrum drawn on the f-axis, they can be distinguished from each other and understood clearly.

It is to be noted that the foregoing relates to only a preferred embodiment of the invention and that various changes and modifications may be made therein.

In the above example, the powers of waves are calculated to sequence solutions that are taken into account for calculating the AIC (m, n). In a modified example, the initial amplitude (A) of each wave is divided by | attenuation constant (g) |, the obtained quotients of all waves are compared, and the quotients are arranged in descending order. In a simpler example, only the initial amplitudes (A) of all waves may be compared.

Also in the above example, the signal observed by the pulse NMR is analyzed. The invention is also applicable to other complex signals taken at intervals of time, e.g., an electron spin resonance signal obtained by applying a pulse of microwave radiation to a sample and a signal derived by ion cyclotron resonance.

Also in the above example, the analysis using an autoregressive model utilizes the Sompi method. The selection of solutions using the AIC is combined with this analysis. This selection may be combined with analysis employing another autoregressive model such as the linear prediction method.

As can be understood from the description made thus far, a method according to the invention comprises the steps of: sampling two components of a signal at intervals of time, the two components being $\pi/2$ out-of-phase; and applying the Sompi method extended to the complex domain to the two components to analyze the signal using an autoregressive model. Sufficient amounts of noise can be removed from the two components. Therefore, a spectral analysis can be made at quite high resolution.

Another method of spectral analysis according to the invention comprises the steps of: finding frequencies and attenuation constants from a signal taken at intervals of time, using an autoregressive model; applying the least squares method to the found frequencies and attenuation constants of the signal to find initial amplitudes and phases that are other parameters of waves; and calculating Akaike's information criterion, AIC, from information about solutions to select the optimum ones from the derived solutions. Let m be the order of the autoregressive model.

This method is characterized by the following steps:

(a) With respect to the solutions of each order m, the powers or the initial amplitudes of waves of the same order are compared, and the solutions are arranged in descending order for the waves of each order m.

(b) Then, n solutions are successively selected from the solutions of each order m according to the sequencing. The least squares method is applied to the frequencies and the attenuation constants of the n waves of the signal to find the initial amplitudes and the (c) The n waves are successively taken into account according to the sequencing to calculate Akaike's information criterion, AIC (m, n), where m and n are parameters.

(d) A combination of order $m_o$ and the number of solutions $n_o$ which minimizes the AIC (m, n) is found.

(e) Then, $n_o$ solutions of upper orders are selected from the solutions of the order $m_o$ and then displayed or recorded.

Therefore, if signal waves containing large amounts of noise components are analyzed by this method, only those spectral components which are highly likely to exist actually can be automatically extracted without sacrificing high resolution. This greatly improves spectral analysis.

In a further method according to the invention, the spectral components contained in said solutions are plotted on the frequency (f) axis. These spectral components are also plotted on the plane defined by both frequency f and attenuation constant g. This display on the plane is juxtaposed to the display on the frequency axis. When individual peaks of a spectrum drawn on the frequency axis are interpreted from the line shape of the spectrum plotted on the frequency axis, it is easy to see whether any peaks are superimposed.

Having thus described our invention in the detail and particularity required by the Patent Laws, what is desired to be protected by Letters Patent is set forth in the following claims.

What is claimed is:

1. A spectroscopy method comprising:
   (a) producing an output signal being the output of a spectrometer, said signal comprising the summation of signals of multiple frequencies;
   (b) digitizing and sampling the two components of the output signal which are $\pi/2$ radians out-of-phase at spaced time intervals to produce time series data;
   (c) converting the time series data to a frequency spectrum while enhancing the data by applying the Sompi method utilizing an autoregressive model to the data values, the Sompi method being extended to the complex time domain; and
   (d) displaying a substantially noise free frequency spectrum.

2. The spectroscopy method according to claim 1 wherein the spectrometer is a pulsed NMR spectrometer and the signal at the output of the spectrometer is a FID signal.

3. The spectroscopy method according to claim 1 wherein the spectrometer is a FTMS and the signal at the output of the spectrometer is a FTMS output signal.

4. The spectroscopy method according to claim 1 or 3 wherein the noise free spectrum is displayed by:
   i) plotting the spectral components contained in said solutions on the frequency axis (f) to create a first spectrum; and
   ii) plotting the spectral components on the plane defined by both frequency (f) and the attenuation constant axis (g) to create a second spectrum that is juxtaposed with the first spectrum.

5. A spectroscopy method comprising:
   (a) producing an output signal being the output of a spectrometer, said signal comprising the summation of signals of multiple frequencies;
   (b) digitizing and sampling the two components of the output signal which are $\pi/2$ radians out-of-phase at spaced time intervals to produce time series data;
   (c) converting the time series data to a frequency spectrum by finding frequencies and attentuation constants of wave elements by use of an autoregressive model comprising:
      i) applying a fitting method to the time series data using the frequencies and attenuation constants of the data to find initial amplitudes and phases of n waves by selecting n solutions from the solutions of each order m according to a predetermined method and applying the fitting method thereto;
      ii) calculating Akaike's information criterion, AIC (m, n), from the parameters m and n by successively substituting the values of the n waves according to the method of selection;
      iii) finding a combination for order $m_o$ and the number of solutions $n_o$ which minimize the AIC (m, n);
      iv) selecting substituted $n_0$ solutions from the solutions of the order $m_o$; and
   d) displaying the selected solutions as a noise free frequency spectrum.

6. The spectroscopy method according to claim 5 wherein the spectrometer is a pulsed FT NMR spectrometer and the signal at the output of the spectrometer is a FID signal.

7. The spectroscopy method according to claim 5, wherein the spectrometer is a FTMS and the signal at the output of the spectrometer is a FTMS output signal.

8. A spectroscopy method comprising:
   (a) producing an output signal being the output of a spectrometer, said signal comprising the summation of signals of multiple frequencies;
   (b) digitizing and sampling the two components of the output signal which are $\pi/2$ radians out-of-phase at spaced time intervals to produce time series data;
   (c) converting the time series data to a frequency spectrum by finding frequencies and attenuation constants of wave elements by use of an autoregressive model comprising:
      i) comparing the powers or the initial amplitudes of waves of the same order m of the autoregressive model with respect to the solutions of each order m and sorting the solutions in descending order of powers or the initial amplitudes for the waves of each order m;

ii) selecting n solutions successively from the solutions of each order m according to the sequencing and applying the least squares method to the time series data using the frequencies and the attenuation constants of n waves of the signal to find the initial amplitudes and the phases of the n waves;

iii) calculating Akaike's information criterion, AIC (m, n) from the parameters m and n by successively substituting the values of the n waves according to the sequencing;

iv) finding a combination of order $m_o$ and the number of solutions $n_o$ which minimizes the AIC (m, n);

v) selecting $n_o$ solutions of upper orders from the solutions of the order $m_o$ according to the sequencing;

d) displaying the selected solutions as a noise free frequency spectrum.

9. The spectroscopy method according to claim 8 wherein the spectrometer is a pulsed NMR spectrometer and the signal at the output of the spectrometer is a FID signal.

10. The spectroscopy method according to claim 8 wherein the spectrometer is a FTMS and the signal at the output of the spectrometer is a FTMS output signal.

* * * * *

UNITED STATES PATENT AND TRADEMARK OFFICE
CERTIFICATE OF CORRECTION

PATENT NO. : 5,295,086
DATED : March 15, 1994
INVENTOR(S) : Mineo Kumazawa, Yuichi Imanishi and Toshio Matsuura It is certified that error appears in the above-indentified patent and that said Letters Patent is hereby corrected as shown below:

Title page, item [73] Assignee:, "Jeol Ltd." should read --JEOL Ltd.--.

Column 2 Line 27 "s" should read --is--.

Column 2 Line 40 "(17)" should read --(7)--.

Column 3 Line 49 "ch" should read --which--.

Column 4 Lines 3-4 before "above-described" insert --the--.

Column 6 Line 65 "solution" should read --solutions, drawn--.

Column 7 Line 31 after "$m_{max}$)" insert --.--.

Column 9 Line 19 after "and the" insert --phases of the n waves.--.

Claim 4 Lines 4-5 Column 10 "1 or 3" should read --1, 5 or 8--.

Signed and Sealed this

Sixteenth Day of August, 1994

*Attest:*

BRUCE LEHMAN

*Attesting Officer*  *Commissioner of Patents and Trademarks*